O. O. STORLE.
Grain Binder.

No. 71,660.

2 Sheets—Sheet 1.

Patented Dec. 3, 1867.

Witnesses:

Inventor:
Ole O. Storle.

O. O. STORLE.
Grain Binder.
No. 71,660.
2 Sheets—Sheet 2.
Patented Dec. 3, 1867.
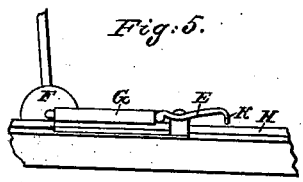
Fig. 5.
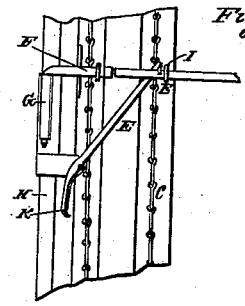
Fig. 4.
Fig. 9.
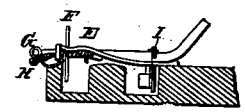
Fig. 6.
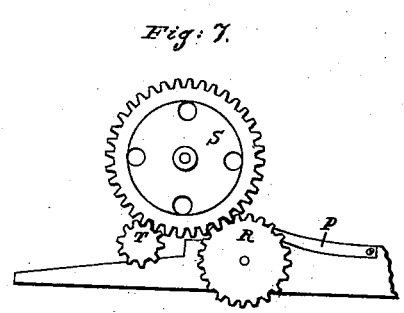
Fig. 7.
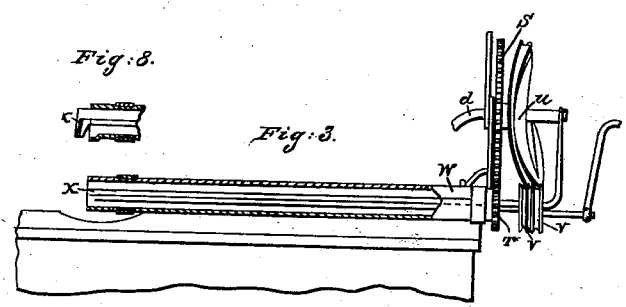
Fig. 8.
Fig. 3.
Witnesses:
Inventor:
Ole O. Storle

UNITED STATES PATENT OFFICE.

OLE O. STORLE, OF NORWAY, ASSIGNOR TO HIMSELF AND ISAAC N. MASON, OF MILWAUKEE, WISCONSIN.

IMPROVEMENT IN GRAIN-BINDERS.

Specification forming part of Letters Patent No. 71,660, dated December 3, 1867.

*To all whom it may concern:*

Be it known that I, OLE O. STORLE, of the town of Norway, in the county of Racine and State of Wisconsin, have invented a new and useful Improvement in Machinery for Raking and Binding Grain; and I do hereby declare that the following is a full, clear, and exact description thereof, which will enable those skilled in the art to make and use the same, reference being had to the accompanying drawing, forming part of this specification, in which—

Figure 1:
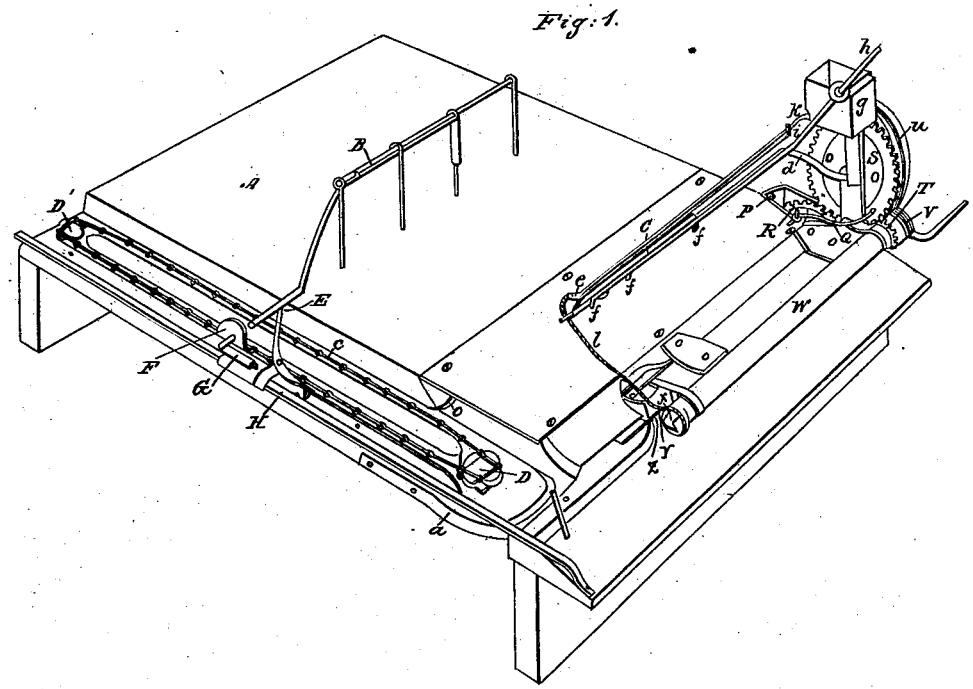
Figure 2:
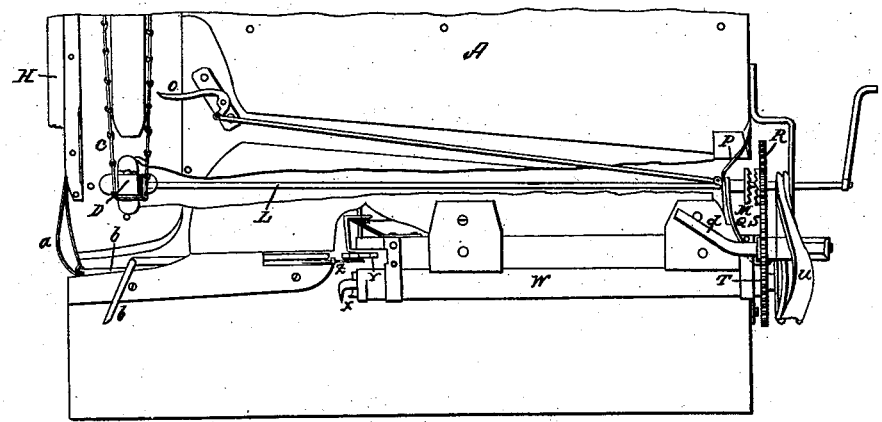

Figure 1 is a perspective view, with the rake traveling toward the binder; Fig. 2, a top sectional view, broken away to show the main driving-shaft and connections; Fig. 3, vertical view of binding-gear; Fig. 4, section of rake and its connections; Fig. 5, section of rake and side view of slide; Fig. 6, section of rake and slide, end view; Fig. 7, section of binding-gear; Fig. 8, section of knot-tying nippers. Fig. 9 shows the kind of knot the machinery ties.

Similar letters of reference in each of the figures indicate corresponding parts.

The object of my invention is to rake and bind grain automatically by machinery which can be attached to any reaping-machine, and do the work in an efficient manner.

A, platform, on which the grain falls when cut; B, rake, which brings the grain to the binders; C, endless chain, with which the rake is operated; D and D', spur-wheels, which operate the chain; E, rod, which connects the rake to the chain; F, loose wheel, on rake-shaft; G, socket for the rake-shaft. The part of the rake-shaft which enters this socket is turned at right angles to the rake, so that the rake can be raised to a perpendicular position, if necessary, without deranging any part of the machinery. H, sliding strip on the edge of the platform A, on which a slide works to which the rake is attached. On the inside of this slide is a grooved way, in which travels the loose wheel F, raising the rake to about an angle of forty-five degrees as it is carried back after the grain to be bound. I, stop on the rake-shaft to throw a clutch into gear to operate the binder; K, hook on the end of rod E, with which to operate the knife which cuts the binding-cord; L, main driving-shaft, with pinion on its end gearing into a pinion on the shaft of spur-wheel D, which operates the rake; M, clutch on main driving-shaft L; N, clutch-rod; O, lever attached to clutch rod, which stop I strikes to throw clutch M into gear, P, spring attached to the clutch, which throws the clutch out of gear when released; Q, lever, with a hook on one end, and the other end connected with spring P. This lever has a fulcrum at its center. R, pinion on main driving-shaft; S, wheel, by which the binding apparatus is operated; T, wheel, to revolve knot-tying apparatus.; U, wabbling wheel on same shaft as wheel S; V, grooved wheels or pulleys on the nipper-shanks; W, revolving cylinder inclosing the knot-tying apparatus; X, nippers, which tie the knot in the binding-cord. These nippers are on the end of shafts passing through cylinder W in slots. On these shafts are the grooved pulleys V, each working independent of the other in their end play, but both revolve together with cylinder W. Y, a slotted wheel to hold the end of the binding-cord as it is pressed between the wheel as it revolves, and a plate. The wheel in its pressure against the plate is regulated by a spring. The shaft of wheel Y has end play, and it has a toothed wheel on its outer end, and a spring performs the service of keeping the wheel pressed against the plate so as to hold firmly the end of the binding-cord, and also serves as a hand working in the teeth of the wheel to keep the wheel from being turned back. Z, knife to cut the binding-cord after the knot is tied; *a*, spring, connected with cutting-knife; *b*, handle of cutting-knife; *c*, sheaf-compressor; *d*, crank, by which the compressor is operated; *e*, eye, through which the binding-cord passes; also an incline to turn the notched wheel Y; *f*, fingers on the compressor, which receive the grain from the rake; *h*, binding-cord box; *g*, handle on compressor *e*, passing through an eye on the shaft of the cord-box; *i*, wire with eye for the binding-cord to pass through; *k*, tension-spring in the bottom of the cord-box. This spring is regulated by a screw, so as to press harder or lighter on the binding-cord *l*, which passes under it, as may be desired.

Operation: The main driving-shaft is connected with the driving-gear of a reaper. We will suppose the rake traveling toward the binding apparatus, bringing grain along the platform A with it. When the stop I comes in contact with the lever O, clutch M is thrown into gear, which puts the binding apparatus in operation. The rake brings the grain up to the sheaf-compressor $c$, which, by the revolving of crank $d$, which turns with wheel S, passes down, bringing finger $f$ behind the grain, taking it from the rake and pressing it into the bight of the binding-cord, the end of the cord being held by wheel Y. The compressor brings eye $e$, through which the cord passes, down, so as to bring the cord into the notch in the wheel Y, and the incline on eye $e$, catching into the next notch in the wheel, turns it so that both parts of the binding-cord are held firmly by the wheel; cylinder W revolves; the binding-cord comes inside of the nipper-points X. The wabbling wheel U, fitting in the grooves of pulleys V, draws the nipper-points into the cylinder, as shown in Fig. 3. The cord being thus held, the cylinder, revolving, takes a twist in it. The spread of the wheel U throws out the outer nipper, the inside one still holding the cord fast, and, as it comes round, the two parts of the binding-cord fall between the nipper-points, which shut on them, and draw them through the loop made by the twist, and tie the knot. At this point hook K hooks onto knife handle $b$, pressing it back, and, as it slips by the handle, spring $a$ throws the knife forward and cuts both parts of the cord outside of the knot, letting the sheaf fall to the ground. The end of the binding-cord is held by the wheel Y ready to bind the next sheaf. As wheel S comes round, the hook on the end of lever Q is forced into a hole in the wheel by spring P, and clutch M is thrown out of gear, and the binding apparatus stops.

As the chain passes round spur-wheel D, connecting-rod E comes in contact with wheel F and throws it out on the rake-shaft, so that it strikes the groove in sliding strip H, which raises the rake to about an angle of forty-five degrees, where it rides till it gets to the back end of the platform, when it falls off the end of the grooved way, letting the rake down on the platform A. The wheel F then passes between the sliding strip H and the chain C. As the chain passes round the spur-wheel D, a hook on the end of connecting-rod E hooks onto the rake-shaft and gives it a steady and strong motion forward.

What I claim as my invention, and desire to secure by Letters Patent, is—

1. Rake B, endless chain C, spur-wheels D and D′, connecting-rod E, loose wheel F, socket G, and sliding way H, in combination, substantially as described.

2. Compressor $c$, binding-cord $l$, crank $d$, and wheel S, in combination when operated substantially as and for the purpose described.

3. Wabbling wheel U, pulleys V, and nippers X, in combination, operating substantially as and for the purpose described.

4. Clutch M, spring P, lever Q, and wheel S, in combination, substantially as described.

5. Clutch M, pinion R, wheel S, wheel Y, and cylinder W, operating in combination, substantially as described.

6. Slotted wheel Y, in combination with compressor $c$ and nippers, X, substantially as and for the purpose described.

7. Slotted wheel Y, knife Z, and spring $a$, in combination, substantially as described.

OLE O. STORLE.

Witnesses:
 J. B. SMITH,
 PERCY B. SMITH.